United States Patent
Park et al.

(10) Patent No.: US 8,604,339 B2
(45) Date of Patent: Dec. 10, 2013

(54) PHOTORECEPTIVE LAYER COMPRISING METAL OXIDE OF CORE-SHELL STRUCTURE AND SOLAR CELL USING THE SAME

(75) Inventors: Sang-cheol Park, Seoul (KR); Jung-gyu Nam, Yongin-si (KR); Ki-yong Song, Seoul (KR); Chang-ho Noh, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 1319 days.

(21) Appl. No.: 11/337,550

(22) Filed: Jan. 24, 2006

(65) Prior Publication Data
US 2006/0180193 A1    Aug. 17, 2006

(30) Foreign Application Priority Data
Jan. 24, 2005  (KR) .......................... 10-2005-0006349

(51) Int. Cl.
*H01G 9/20*  (2006.01)
(52) U.S. Cl.
USPC ........................................................ 136/263
(58) Field of Classification Search
USPC ........................................................ 136/250
See application file for complete search history.

(56) References Cited

U.S. PATENT DOCUMENTS

| | | | |
|---|---|---|---|
| 5,213,955 A | 5/1993 | Hamada et al. | |
| 6,376,765 B1* | 4/2002 | Wariishi et al. | 136/263 |
| 6,580,026 B1* | 6/2003 | Koyanagi et al. | 136/263 |
| 2002/0108649 A1* | 8/2002 | Fujimori et al. | 136/263 |
| 2003/0027000 A1* | 2/2003 | Greenberg et al. | 428/432 |
| 2004/0118448 A1* | 6/2004 | Scher et al. | 136/252 |

FOREIGN PATENT DOCUMENTS

| | | |
|---|---|---|
| KR | 1990-0018935 | 12/1990 |
| KR | 1999-0042061 | 6/1999 |
| KR | 10-2003-0032538 | 4/2003 |
| KR | 10-2003-0067175 | 8/2003 |

OTHER PUBLICATIONS

U. Diebold, The surface science of titanium dioxide, 2003, Surfce Science Reports, 48, 53 and 62.*
S. Shanthi, H. Anuratha, C. Subramanian, P. Ramasamy, Effect of fluorine doping on structural, electrical and optical properties of sprayed $SnO_2$ thin films, 1998, 369-373.*
KIPO Notice of Allowance dated Jan. 20, 2012, for Korean priority Patent application 10-2005-0006349, 5 pages.

* cited by examiner

*Primary Examiner* — Miriam Berdichevsky
(74) *Attorney, Agent, or Firm* — Christie, Parker & Hale, LLP

(57) ABSTRACT

A photoacceptive layer having a core-shell structure and a solar cell using the same are provided. More specifically, a photoacceptive layer including a metal oxide of a core-shell structure which can improve photoconversion efficiency by improving a electron migration path, and a solar cell using the same are provided.

16 Claims, 2 Drawing Sheets

PHOTORECEPTIVE LAYER COMPRISING METAL OXIDE OF CORE-SHELL STRUCTURE AND SOLAR CELL USING THE SAME

CROSS-REFERENCE TO RELATED PATENT APPLICATION

This application claims priority from Korean Patent Application No. 10-2005-0006349, filed on Jan. 24, 2005, in the Korean Intellectual Property Office, the disclosure of which is incorporated herein in its entirety by reference.

BACKGROUND OF THE DISCLOSURE

1. Field of the Disclosure

The present disclosure relates to a photoacceptive layer comprising a metal oxide of a core-shell structure and a solar cell using the same, and more particularly, to a photoacceptive layer comprising a metal oxide of a core-shell structure which can improve photoconversion efficiency by improving a electron migration path, and a solar cell using the same.

2. Description of the Related Art

To address currently occurring energy problems, studies on alternatives to conventional fossil fuels have been conducted. In particular, broad studies on the utilization of natural energy such as wind power, atomic energy, and solar power for replacing petroleum resources which may be depleted within tens of years have been conducted. Among these, a solar cell using solar energy is unlimited in its resources and is environmental friendly unlike other energy sources. Selenium (Se) solar cells were initially developed in 1883 (see http://en.wikipedia.org/wiki/Solar_cell) and Silicon (Si) solar cells have more recently been considered.

However, such a Si solar cell is limited in practical use and cell efficiency due to its high manufacturing costs. For this reason, the development of a dye-sensitized solar cell that can be very inexpensively manufactured has been actively considered.

Unlike a Si solar cell, a dye-sensitized solar cell is a photoelectrochemical solar cell comprising as main constituents photosensitive dye molecules, which can absorb visible rays to produce electron-hole pairs, and a transition metal oxide which transfers the produced electrons. A representative example of currently available solar cells was reported by Gratzel et al. of Switzerland in 1991. The solar cell of Gratzel et al. includes a semiconductor electrode composed of titanium dioxide ($TiO_2$) nanoparticles which are covered with dye molecules, a counter electrode (Pt electrode), and an electrolyte interposed therebetween. This cell is in the attracting interest due to its low manufacturing costs per power unit compared to a conventional Si solar cell.

FIG. 1 illustrates a structure of a dye-sensitized solar cell. Referring to FIG. 1, the dye-sensitized solar cell includes a semiconductor electrode 10, an electrolyte layer 13, and a counter electrode 14. The semiconductor electrode 10 consists of a transparent conductive substrate 11 and a photoreceptive layer 12. That is, the electrolyte layer 13 is interposed between the semiconductor electrode 10 and the counter electrode 14.

The photoreceptive layer 12 is generally composed of a metal oxide 12a and a dye 12b. The dye 12b can be represented by S, S* and S$^+$ which respectively designate neutral, a transition state, and an ionic state. When the dye 12b absorbs sunlight, electron transition from a ground state (S/S$^+$) to an excited state (S*/S$^+$) occurs to produce an electron-hole pair. The excited electrons (e$^-$) are injected into a conduction band (CB) of the metal oxide 12a to produce an electromotive force.

All the excited electrons do not migrate to the conduction band of the metal oxide 12a and recombine with dye molecules to return to the ground state or induce a recombination reaction in which electrons that migrate to the conduction band combine with redox couples in the electrolyte 13. This causes the photoconversion efficiency to decrease, resulting in a reduction in electromotive force.

To prevent the recombination reaction, attempts to form a protective layer on the metal oxide 12a have been carried out in which the metal oxide 12a has a core-shell structure. However, the largest problem in this instance is that since different oxides are used to form the core-shell structure, interfacial resistance increases, which makes it difficult for electrons to migrate to a central core through an outer shell. That is, since a conventional oxide layer includes core particles having a protective layer (shell) formed thereon as illustrated in FIG. 2, electrons produced from dye molecules must migrate to a transparent conductive substrate through a shell, a core, a shell, a core, etc., and thus electron migration is difficult due to interfacial resistance generated when electrons migrate through interfaces.

Moreover, the oxide used to form the protective layer (shell) has a lower resistance than the core particles, and thus has an increased reactivity to the electrolyte layer. As a result, the protective layer cannot prevent the recombination reaction.

SUMMARY OF THE DISCLOSURE

The present invention may provide a photoacceptive layer which prevents a recombination reaction and has improved photoconversion efficiency.

The present invention also may provide a solar cell using the photoacceptive layer.

According to an aspect of the present invention, there may be provided a photoacceptive layer including: a core matrix composed of a metal oxide; and a protective layer formed on the core matrix.

The core matrix may be composed of at least one metal oxide selected from the group consisting of titanium oxide, niobium oxide, nickel oxide, copper oxide, zirconium oxide, hafnium oxide, tungsten oxide, strontium oxide, titanium strontium oxide, zinc oxide, indium oxide, and tin oxide. The core matrix may be composed of titanium oxide or tin oxide, and more particularly, titanium dioxide or tin dioxide.

The protective layer may be composed of a metal oxide which is the same species as but has a different crystalline structure from the metal oxide for the core matrix. The metal oxide for the protective layer may have higher resistance or higher potential than the metal oxide for the core matrix. For example, when the metal oxide for the core matrix is rutile titanium dioxide, the metal oxide for the protective layer may be anatase titanium dioxide or amorphous titanium dioxide, and when the metal oxide for the core matrix is anatase titanium dioxide, the metal oxide for the protective layer may be an amorphous titanium dioxide.

The protective layer may have a thickness of about 200 nm or less.

Dye molecules may be adsorbed on the protective layer to form a dye layer.

According to another aspect of the present invention, there may be provided a photoelectrode including: a transparent conductive substrate; and the photoacceptive layer described above.

According to still another aspect of the present invention, there may be provided a dye-sensitized solar cell including: a transparent conductive substrate; the photoacceptive layer described above; an electrolyte layer; and a counter electrode.

BRIEF DESCRIPTION OF THE DRAWINGS

The above and other features and advantages of the present invention will be described in detailed exemplary embodiments thereof with reference to the attached drawings in which.

DETAILED DESCRIPTION OF EXEMPLARY EMBODIMENTS

Exemplary embodiments of the present invention will now be described more fully with reference to the accompanying drawings.

Figure 3:
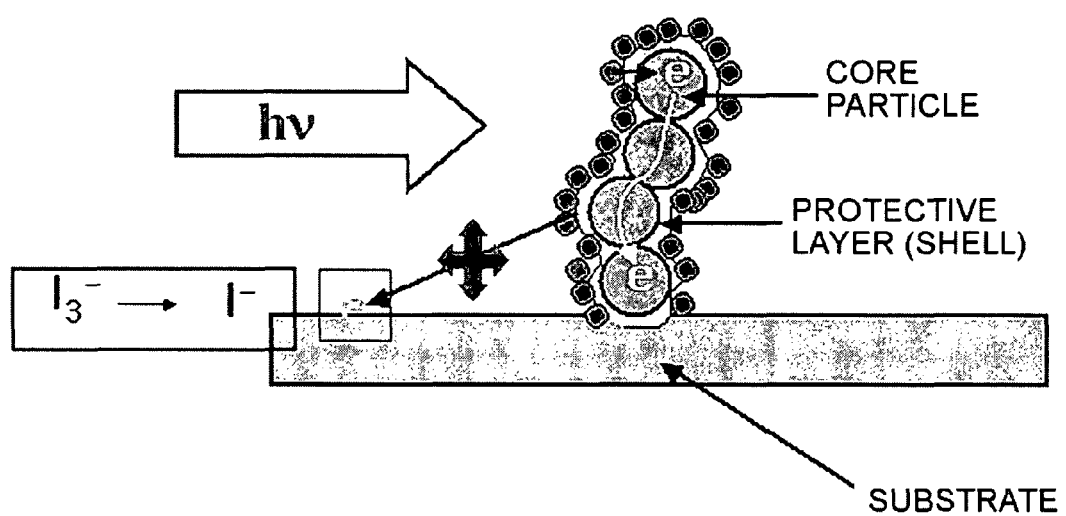
FIG. 3 is a cross-sectional view of a photoacceptive layer having a core-shell structure according to an embodiment of the present invention.

A photoacceptive layer according to an embodiment of the present invention has a double-layer structure including a core matrix and a protective layer formed thereon in a shell form in order to improve the photoconversion efficiency. Such a double-layer structure is prepared by forming a metal oxide layer on a substrate, sintering the metal oxide layer to form the core matrix, and then forming the protective layer thereon in a shell form, as illustrated in FIG. 3.

Figure 2:
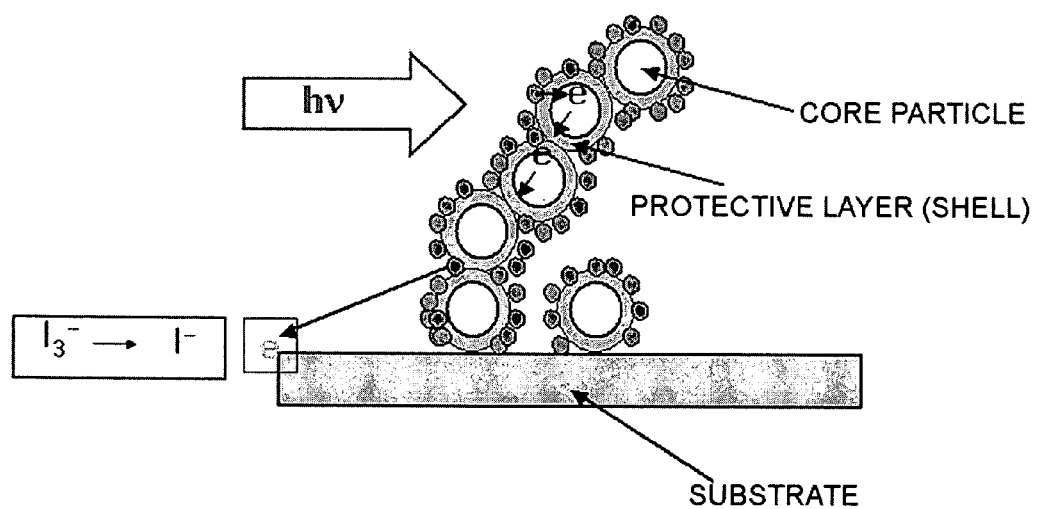
FIG. 2 is a cross-sectional view of a conventional photoacceptive layer having a core-shell structure.

In the photoacceptive layer having such a structure, electrons easily migrate in the metal oxide of the core matrix after being injected into the core matrix. That is, while interfacial resistance is necessarily generated by interfaces in the conventional core-shell structure as illustrated in FIG. 2, interfacial resistance is rarely present in the structure of the current embodiment of the present invention, which enables electrons to easily migrate.

Moreover, the metal oxide of the core matrix is coated with the protective layer in a shell form, and thus is not exposed to an electrolyte layer, thereby maximizing the effect of preventing a recombination reaction in which electrons return to the electrolyte layer. The recombination reaction, which is a factor for reducing photoconversion efficiency, is suppressed in the manner described above, which makes it possible to improve photoconversion efficiency.

The metal oxide used to form the core matrix may be n-type semiconductors in which electrons of a conduction band act as carriers to provide an anode current. Examples of the metal oxide include titanium oxide, niobium oxide, nickel oxide, copper oxide, zirconium oxide, hafnium oxide, tungsten oxide, strontium oxide, titanium strontium oxide, zinc oxide, indium oxide, and tin oxide. Specifically, $TiO_2$, $SnO_2$, $ZnO$, $WO_3$, $Nb_2O_5$, and $TiSrO_3$ may be used. More specifically, anatase or rutile $TiO_2$ may be used. The semiconductor is not limited to the use of these materials. These materials may be used alone or in a combination of two or more. The semiconductor particles may have a large surface area to enable a dye adsorbed on their surfaces to absorb more light. For the purpose of this, the semiconductor particles may have a particle diameter of about 5 to 30 nm.

To form the core matrix using the metal oxide, a metal oxide precursor is dissolved in a solvent to prepare a paste or a solution, followed by applying it to a substrate and calcining to cause contact or packing between oxide nanoparticles, thereby obtaining a calcined body.

Examples of the metal oxide precursor include alkoxide compounds, halides, nitrides, or powders of a transition metal. For example, the precursor of a titanium oxide may be titanium (IV) isopropoxide or titanium oxide powder, but is not limited thereto. Examples of the solvent include, but are not limited to, an acid solution such as acetic acid, terpineol, ethanol, etc. The calcining may be accomplished by drying at about 100° C. for about 1-10 hours, and then heating at 400-550° C. for about 0.1-2 hours.

According to the present invention, a protective layer in a shell form is formed on the resulting metal oxide core matrix. As described above, the protective layer separates the core from an electrolyte layer to prevent the recombination reaction. In particular, the protective layer is not formed on the respective metal oxide particles but is coated on the whole outer surface of the calcined core matrix to minimize an interface between the protective layer and core particles, thereby reducing the interfacial resistance. Due to the reduced interface resistance, electrons which are injected from the electrolyte layer to core particles more easily migrate to an electrode than a conventional metal oxide layer having a core-shell structure.

A metal oxide used to form the protective layer may be the same species as or different from the metal oxide used to form the core matrix, and preferably the same species as the metal oxide used to form the core matrix. When the metal oxide for the core matrix is the same species as the metal oxide for the protective layer, they may have different crystalline structures. In particular, the metal oxide for the protective layer may have a higher resistance or potential than the metal oxide for the core matrix.

For example, in the case of titanium dioxide ($TiO_2$) having rutile-type, anatase-type, or amorphous crystalline structure, when rutile titanium dioxide is used as the core matrix, anatase or amorphous titanium dioxide may be used as the protective layer. This is because the anatase and amorphous titanium dioxides have a higher resistance than the rutile titanium dioxide, and thus they more effectively suppresses the reactivity to the electrolyte layer when they are used as the protective layer. Since the resistance of the anatase titanium dioxide is lower than that of the amorphous titanium dioxide, when the anatase titanium dioxide is used as the core matrix, the amorphous titanium dioxide is used as the protective layer.

The protective layer is obtained by applying a paste or solution including a metal oxide precursor for the protective layer to the core matrix using a spin coating, dipping, spray coating, screen printing methods, etc., and then calcining the applied paste or solution. The protective layer has preferably a thickness of about 200 nm or less, more preferably a thickness of about 5-200 nm. When the thickness of the protective layer is greater than about 200 nm, it may be difficult to inject electrons into the core.

The photoacceptive layer of the present embodiment may further include dye particles. The dye particles are adsorbed on the surface of the protective layer. When the dye particles absorb light, electron transition from a ground state ($S/S^+$) to an excitation state ($S^*/S^+$) occurs to form an electron-hole pair. An excited electron ($e^-$) is injected into a conduction band of the core matrix through the protective layer, and then migrates to an electrode to induce electromotive force.

The dye may be any dye which is generally used in a solar cell field, but a ruthenium complex is preferred. The nature of the dye is not particularly critical so long as it can separate charges and is sensitive to light. In addition to the ruthenium complex, examples of the dye include xanthene dyes such as Rhodamine B, Rose Bengal, Eosine, or erythrosine; cyanine dyes such as quinocyanine or cryptocyanine; basic dyes such as phenosafranine, Capri Blue, thiosine, or Methylene Blue; porphyrin-type compounds such as chlorophyll, zinc porphyrin, or magnesium porphyrin; azo dyes; phthalocyanine compounds; complexes such as Ru trisbiphyridyl; anthraquinone dyes; and polycyclic quinone dyes. These dyes may be used alone or in a combination of two or more. Examples of the Ru complex include $RuLL'(SCN)_2$, $RuL_2(SCN)_2$, $RuL_2(H_2O)_2$, $RuL_3$, $RuL_2$ (in which L represents 2,2'-bipyridyl-4,4'-dicarboxylate), etc.

Figure 1:
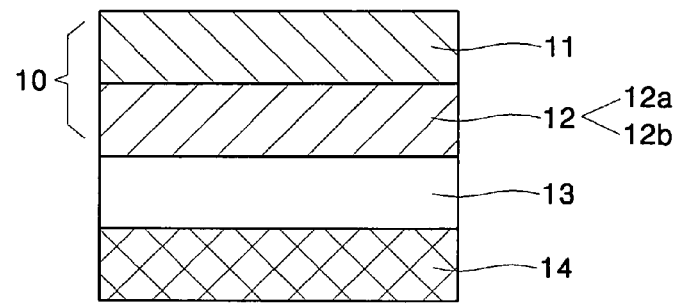
FIG. 1 is a schematic cross-sectional view of a dye-sensitized solar cell according to an embodiment of the present invention.

The photoacceptive layer according to the present embodiment prevents the recombination reaction and allows electrons to easily migrate to an electrode. Thus, when the photoacceptive layer is used in a dye-sensitized solar cell, it can improve photoconversion efficiency. FIG. 1 illustrates an example of a dye-sensitized solar cell having a photoacceptive layer 12 according to an embodiment of the present invention. The solar cell includes a photoelectrode 10, an electrolyte layer 13, and a counter electrode 14. The photoelectrode 10 includes a transparent conductive substrate 11 and the photoacceptive layer 12. As described above, the photoacceptive layer 12 includes a core matrix and a protective layer 12a, and, if necessary, a dye 12b.

A transparent substrate used as the transparent conductive substrate 11 may be any substrate having transparency, for example, a glass substrate. A material to provide the transparent substrate with conductivity may be any material having conductivity and transparency. Sn oxides (e.g., $SnO_2$), etc. are suitable due to their high thermal resistance, in addition to conductivity and transparency, and indium tin oxide (ITO) is preferred in view of cost considerations.

The photoacceptive layer 12 including the core matrix and the protective layer 12a has a thickness of about 30 μm or less, preferably about 10-20 μm. The photoacceptive layer 12 has a high series resistance due to its structure. An increase in series resistance leads to a reduction in photoconversion efficiency. By forming the photoacceptive layer with a thickness of about 30 μm or less, a low series resistance is maintained and the reduction in photoconversion efficiency can be prevented.

The electrolyte layer 13 consists of an electrolyte, and includes the photoacceptive layer 12 or is formed such that the photoacceptive layer 12 is immersed in an electrolyte. Examples of the electrolyte include, but are not limited to, an acetonitrile solution of iodine, an NMP solution, 3-methoxypropionitrile, etc. Any electrolyte having a hole conducting function can be used.

The counter electrode 14 may be composed of any conductive material. However, an insulating material can also be used to form the counter electrode 14 when a conductive layer is formed on a side of the counter electrode 14 facing the photoelectrode 10. An electrochemically stable material may be used for the counter electrode 14. For example, Pt, Au, C, etc. can be used. To improve a catalytic effect on a redox reaction, the counter electrode 14 may have a large surface area on the side facing the photoelectrode. For the large surface area, for example, when the electrode material is platinum, a platinum black is used, and when the electrode material is carbon, carbon is used in a porous state. The platinum black can be obtained by an anodic oxidation method, a chloroplatinate treatment, etc. The porous carbon can be prepared by sintering carbon particles or calcining an organic polymer.

A method of manufacturing the dye-sensitized solar cell according to an embodiment of the present invention is not particularly limited and a conventional manufacturing method, etc. can be used.

Hereinafter, the present invention will be described more specifically with reference to the following examples. The following examples are for illustrative purposes and are not intended to limit the scope of the invention.

EXAMPLE 1

A $TiO_2$ paste (available from Solaronix, TI nanoxide, HTSP) was coated on a transparent conductive glass substrate coated with ITO and having a transmittance of 80% to a size of 1×1 cm². The coated glass substrate was subjected to a thermal treatment process at 450° C. for 30 minutes. During this time, the thermal treatment conditions were a heating rate of 3° C./min and a cooling rate of 5° C./min.

5 wt % Tyzor (available from Dupont) was used to form a shell structure on the thermally treated sample. The 5 wt % Tyzor was prepared by adding 47.5 g of butanol to 2.5 g of Tyzor.

To form the shell structure on the $TiO_2$ layer of a core structure, the 5 wt % Tyzor solution was coated on the $TiO_2$ layer by dipping, and was then subjected to a thermal treatment process in an oven at 100° C. for 20 minutes. The immersion time was 30 seconds.

The resultant photoelectrode was immersed in a dye (available from Solaronix, Ru 535) for 20 hours to allow the dye to be adsorbed to the photoelectrode. A transparent conductive glass substrate coated with Pt was disposed so as to face the dye-adsorbed photoelectrode as a counter electrode, thereby forming a cell. Next, an electrolyte (available from Solaronix, Idolie) was charged between two electrodes to complete a dye-sensitized solar cell.

EXAMPLE 2

A dye-sensitized solar cell was manufactured in the same manner as in Example 1, except that a sample coated with $TiO_2$ was immersed in the 5 wt % Tyzor solution for 60 seconds by dipping.

COMPARATIVE EXAMPLE 1

A $TiO_2$ paste (available from Solaronix, TI nanoxide, HTSP) was coated on a transparent conductive glass substrate to a size of 1×1cm². The coated glass substrate was subjected to a thermal treatment at 450° C. for 30 minutes. During this time, the thermal treatment conditions were a heating rate of 3° C./min and a cooling rate of 5° C./min. A dye-sensitized solar cell was manufactured by conducting the same procedures as in Example 1 except for the formation of a protective layer.

EXPERIMENTAL EXAMPLE

Photocurrent voltages of the dye-sensitized solar cells manufactured in Examples 1 and 2 and Comparative Example 1 were measured using a photocurrent measurement system (e.g. Solar simulator available from Seric, I-V Curve Tracer available from Eko) to obtain a photocurrent voltage curve. A current density ($I_{sc}$), a voltage ($V_{oc}$), and a fill factor (FF) were calculated from the photocurrent voltage curve. Then, the photoconversion efficiency ($\eta_e$) was obtained from the calculated values and shown in Table 1. The photoconversion efficiency is calculated using the following equation:

$$\eta_e = (V_{oc} I_{sc} FF)/(P_{inc})$$

where $P_{inc}$ is 100 mw/cm² (1 sun).

TABLE 1

| | FF (%) | Photoconversion efficiency (%) |
|---|---|---|
| Example 1 | 57.5 | 4.170 |
| Example 2 | 56.7 | 3.982 |
| Comparative Example 1 | 54.8 | 3.964 |

As is apparent from Table 1, the dye-sensitized solar cells having the photoacceptive layer according to the present invention had improved FF, and thereby, an improved photoconversion efficiency compared to the dye-sensitized solar cell of Comparative Example 1. This is believed to be because the protective layer formed on the metal oxide surface reduced a resistance to electron migration.

The photoacceptive layer having a core-shell structure according to the present invention includes a core matrix composed of a metal oxide and a protective layer coated thereon, and thus prevents a recombination reaction and enables electrons to easily migrate, thereby improving photoconversion efficiency. Thus, the photoacceptive layer is useful for a dye-sensitized solar cell, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photoacceptive layer comprising:
a core matrix comprising particles of a first metal oxide, wherein the particles directly contact each other;
a protective layer disposed on an entire outer surface of the core matrix, the protective layer comprising a second metal oxide; and
dye particles disposed on the protective layer,
wherein the protective layer is interposed between the core matrix and the dye particles, wherein the first metal oxide and the second metal oxide have the same chemical formula, and wherein the second metal oxide has a different crystalline structure than the first metal oxide of the core matrix.

2. The photoacceptive layer of claim 1, wherein the first metal oxide is at least one metal oxide selected from the group consisting of titanium oxide, niobium oxide, nickel oxide, copper oxide, zirconium oxide, hafnium oxide, tungsten oxide, strontium oxide, titanium strontium oxide, zinc oxide, indium oxide, and tin oxide.

3. The photoacceptive layer of claim 1, wherein the first metal oxide is titanium dioxide or tin dioxide.

4. The photoacceptive layer of claim 1, wherein the protective layer has a higher resistance than the core matrix.

5. The photoacceptive layer of claim 1, wherein the protective layer has a higher electrochemical potential than the core matrix.

6. The photoacceptive layer of claim 1, wherein when the first metal oxide is rutile titanium dioxide, and the second metal oxide is anatase or amorphous titanium dioxide.

7. The photoacceptive layer of claim 1, wherein when the first metal oxide is anatase titanium dioxide, and the second metal oxide is amorphous titanium dioxide.

8. The photoacceptive layer of claim 1, wherein the protective layer has a thickness of about 200 nm or less.

9. The photoacceptive layer of claim 1, wherein the dye particles are adsorbed on an outer surface of the protective layer.

10. A photoelectrode comprising:
a transparent conductive substrate; and
a photoacceptive layer disposed on the transparent conductive substrate, the photoacceptive layer comprising
a core matrix comprising particles of a first metal oxide, wherein the particles directly contact each other;
a protective layer disposed on an entire outer surface of the core matrix, the protective layer comprising a second metal oxide; and
dye particles disposed on the protective layer,
wherein the protective layer is interposed between the core matrix and the dye particles, wherein the first metal oxide and the second metal oxide have the same chemical formula, and wherein the second metal oxide has a different crystalline structure than the first metal oxide of the core matrix.

11. The photoelectrode of claim 10, wherein the photoacceptive layer has a thickness of about 30 μm or less.

12. The photoelectrode of claim 10, wherein the photoacceptive layer has a thickness of about 10 μm to about 20 μm.

13. A dye-sensitized solar cell comprising:
a transparent conductive substrate;
a photoacceptive layer disposed on the transparent conductive substrate, the photoacceptive layer comprising
a core matrix comprising particles of a first metal oxide, wherein the particles directly contact each other; and
a protective layer disposed on an entire outer surface of the core matrix, the protective layer comprising a second metal oxide; and
dye particles disposed on the protective layer,
wherein the protective layer is interposed between the core matrix and the dye particles, wherein the first metal oxide and the second metal oxide have the same chemical formula, and wherein the second metal oxide has a different crystalline structure than the first metal oxide of the core matrix;
an electrolyte layer disposed on the photoacceptive layer; and
a counter electrode.

14. The dye-sensitized solar cell of claim 13, wherein the photoacceptive layer has a thickness of about 30 μm or less.

15. The dye-sensitized solar cell of claim 13, wherein the photoacceptive layer has a thickness of about 10 μm to about 20 μm.

16. The dye-sensitized solar cell of claim 13, wherein the electrolyte layer comprises an iodine-based electrolyte solution.

* * * * *